United States Patent
Chiang et al.

(10) Patent No.: US 9,266,250 B2
(45) Date of Patent: Feb. 23, 2016

(54) SAW BLADE GUARD QUICK RELEASE STRUCTURE AND METHOD FOR LOCKING AND UNLOCKING SAW BLADE GUARD

(75) Inventors: Hung-Jung Chiang, Taichung (TW); Wei-Shiun Lin, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 1090 days.

(21) Appl. No.: 13/328,348

(22) Filed: Dec. 16, 2011

(65) Prior Publication Data

US 2012/0159763 A1    Jun. 28, 2012

(30) Foreign Application Priority Data

Dec. 28, 2010    (TW) ............................... 99146293 A (51) Int. Cl.
  *B27G 19/02*    (2006.01)
  *B23P 19/10*    (2006.01)
  *F16B 2/02*    (2006.01)
  *B27G 19/08*    (2006.01)

(52) U.S. Cl.
  CPC .................. *B27G 19/02* (2013.01); *B23P 19/10* (2013.01); *B27G 19/08* (2013.01); *F16B 2/02* (2013.01); *Y10T 29/49826* (2015.01); *Y10T 403/16* (2015.01)

(58) Field of Classification Search
  CPC .......... B27G 19/02; B27G 19/04; F16B 2/02; F16B 2/06; F16B 2/10; F16B 2/14; F16B 2/18; F16B 2/245; Y10T 29/4984; Y10T 29/4987; Y10T 29/49876

USPC ......... 83/478, 544, DIG. 1; 24/326, 327, 328, 24/329, 330, 331, 332, 333, 334, 489, 490, 24/499, 522, 523, 526

See application file for complete search history.

(56) References Cited

U.S. PATENT DOCUMENTS

| 2,024,222 | A | * | 12/1935 | Hinchman | .................. 294/82.32 |
| 4,707,891 | A | * | 11/1987 | Chidester | ..................... 24/136 R |
| 7,210,386 | B1 | | 5/2007 | Chang | |

(Continued)

FOREIGN PATENT DOCUMENTS

| CN | 2846047 Y | 12/2006 |
| CN | 1974094 A | 6/2007 |

(Continued)

OTHER PUBLICATIONS

Chinese Office Action dated Dec. 3, 2013, for CN 201110037785.6, and English translation thereof.

*Primary Examiner* — Christopher M Koehler (74) *Attorney, Agent, or Firm* — Bacon & Thomas, PLLC (57) ABSTRACT

A saw blade guard quick release structure and a method for locking and unlocking saw blade guard includes a locating member, a connection member, and a retaining unit. The locating member has two retaining notches. The connection member includes a first guide portion and a second guide portion. The retaining unit is installed on the connection member, including a linking member, a drag member movable along the first guide portion, two retaining members respectively pivotally connected to the drag member and movable along the second guide portion, and a spring member. The method includes mounting the connection member directly on the locating member and selectively engaging the retaining members with the locating notches, thereby locking or unlocking the saw blade guard.

8 Claims, 8 Drawing Sheets

(56) References Cited

U.S. PATENT DOCUMENTS

| | | |
|---|---|---|
| 7,302,878 B2 | 12/2007 | Chang |
| 7,434,501 B2 | 10/2008 | Chuang |
| 7,546,792 B2 | 6/2009 | Liu et al. |
| 7,806,032 B2 | 10/2010 | Weir et al. |
| 7,891,278 B2 | 2/2011 | Liu et al. |
| 8,037,792 B2 | 10/2011 | Sasaki et al. |
| 2007/0163408 A1* | 7/2007 | Buck et al. ............... 83/438 |
| 2008/0022826 A1 | 1/2008 | Weir et al. |
| 2008/0047409 A1 | 2/2008 | Chuang |
| 2008/0121080 A1 | 5/2008 | Liu et al. |
| 2008/0223189 A1 | 9/2008 | Tanaka |
| 2009/0064836 A1 | 3/2009 | Chuang |
| 2009/0158905 A1 | 6/2009 | Chuang |
| 2009/0158906 A1 | 6/2009 | Shibata |
| 2009/0229437 A1 | 9/2009 | Tanaka |
| 2010/0101389 A1* | 4/2010 | Chiu ....................... 83/102.1 |
| 2010/0116113 A1 | 5/2010 | Wang |
| 2010/0116114 A1 | 5/2010 | Liu et al. |
| 2010/0224044 A1* | 9/2010 | Lee ........................ 83/478 |
| 2011/0061506 A1* | 3/2011 | Frolov ..................... 83/102.1 |
| 2011/0167976 A1* | 7/2011 | Liu ......................... 83/102.1 |

FOREIGN PATENT DOCUMENTS

| | | |
|---|---|---|
| CN | 201105344 Y | 8/2008 |
| TW | M288213 U | 3/2006 |
| TW | I269680 B | 1/2007 |
| TW | M328333 U | 3/2008 |
| TW | I309599 A | 6/2008 |
| TW | M362095 U | 8/2009 |
| TW | M362096 U | 8/2009 |
| TW | 200946309 A1 | 11/2009 |
| TW | 201018558 A1 | 5/2010 |
| TW | M379478 U1 | 5/2010 |
| TW | 201029792 A1 | 8/2010 |
| TW | 201114568 A1 | 5/2011 |

* cited by examiner

SAW BLADE GUARD QUICK RELEASE STRUCTURE AND METHOD FOR LOCKING AND UNLOCKING SAW BLADE GUARD

This application claims, under 35 U.S.C. §119, priority to Taiwanese Application No. 099146293, filed Dec. 28, 2010, which application is hereby incorporated by reference in its entirety, inclusive of the specification, claims, and drawings.

FIELD OF THE INVENTION

The present disclosure relates to saw machines and more specifically, to a saw blade guard quick release structure and a method for locking and unlocking the saw blade guard.

BACKGROUND

A saw machine generally has safety devices to protect users from accidental injuries. For example, a riving knife is typically fixedly mounted at the machine base behind the saw blade to provide protection against cutting and kickback accidents. Further, a saw blade guard can be pivotally mounted at the top side of the riving knife. Such a saw blade guard can extend over the top side of the saw blade to guard the saw blade from accidental contact with an operator.

In order to meet international safety codes, the processes of mounting and maintaining the accessories of a saw machine have become much more complicated. To meet maintenance and mounting requirements for the aforesaid safety devices for a saw machine, these safety devices are all designed to be detachable. Thus, quick release structures for quick mounting and dismounting of safety devices have become the standard for a saw machine.

U.S. patent application Ser. No. 2008/0223189A1 discloses a quick release structure for a saw machine, which includes a curved guide groove located on the top side of a saw blade guard, and a control device. The control device includes a first engagement wheel, a link, and a third engagement wheel pivotally connected to the rear end of the link and guided by the guide groove. Further, a retaining notch is located on the top edge of a riving knife. In order to mount the saw blade guard to the riving knife, the first engagement wheel is attached to one side of the retaining notch, and then the control device is operated. By means of the linking operation of the link, the third engagement wheel is guided by the guide groove into engagement with the other side of the retaining notch to lock the saw blade guard to the top side of the riving knife. This quick release structure enables the saw blade guard to be quickly locked to and unlocked from the riving knife. However, the whole structure comprises a large number of component parts, so assembly of the quick release structure is cumbersome. Furthermore, because the guide groove is curved, the movement of the third engagement wheel along the curved guide groove is unsmooth and requires increased effort.

SUMMARY

The present disclosure has been accomplished under the circumstances in view. It is therefore one object of the present disclosure to provide a saw blade guard quick release structure, which has the features of simple structure, ease of fabrication and assembly, smoothness and ease of operation in order to save time and labor. It is another object of the present disclosure to provide a method for locking and unlocking a saw blade guard, which facilitates mounting and dismounting of the saw blade guard.

To achieve these and other objects of the present disclosure, a saw blade guard quick release structure includes a locating member, a connection member, and a retaining unit. The locating member has two retaining notches correspondingly defined therein. The connection member is affixed to a saw blade guard, and has a first guide portion and two second guide portions which are located at two opposite sides of the first guide portion. The first guide portion extends along a first direction. The second guide portions each extend along a second direction that is generally perpendicular to the first direction. The retaining unit is mounted at the connection member and fastenable to the locating member, including a linking member, a drag member connected to the linking member and slidable along the first guide portion between a first position and a second position, two retaining members respectively pivotally connected to the drag member and movable by the drag member and a spring member positioned between the linking member and the connection member. The spring member is adapted to impart a pressure in order to bias the drag member toward the first position. Each retaining member includes a retaining rod slidable along the second guide portions and selectively engageable in the retaining notches. The retaining members and the drag member are mutually driven by each other between a locking position and an unlocking position. The retaining rods of the retaining members are respectively forced into engagement with the retaining notches in a locking position; the retaining rods of the retaining members are respectively disengaged from the retaining notches in an unlocking position.

To achieve these and other objects of the present disclosure, a method for locking and unlocking a saw blade guard includes the steps of (A) providing a locating member, a connection member and a retaining unit, wherein the locating member has two retaining notches correspondingly defined therein; the connection member is affixed to a saw blade guard, including a first guide portion extending along a first direction and two second guide portions disposed at two opposite sides of the first guide portion and extending along a second direction, perpendicular to the first direction; the retaining unit is mounted to the connection member and fastenable to the locating member, and includes a linking member, a drag member connected to the linking member and slidable along the first guide portion between a first position and a second position, two retaining members respectively pivotally connected to the drag member and movable by the drag member and a spring member positioned between the linking member and the connection member and adapted to impart a pressure to the drag member toward the first position, each retaining member including a retaining rod slidable along the second guide portions and engageable in the retaining notches, the retaining members and the drag member are mutually driven by each other between a locking position and an unlocking position. The retaining rods of the retaining members are respectively forced into engagement with the retaining notches in the locking position. The retaining rods of the retaining members are respectively disengaged from the retaining notches in the unlocking position; and (B) attaching the connection member to the locating member to enable the retaining rods of the retaining unit to be guided by the locating member such that the retaining rods are drawn toward or apart from each other, the drag member driven by the retaining rods to slide along the first guide portion from the first position to the second position so that the spring member resiliently forces the retaining rods into engagement with the retaining notches to lock the saw blade guard to the locating member.

Exemplary beneficial effects of the quick release structure according to the present disclosure include: directly attaching the connection member to the locating member enables the retaining portions be forced into engagement with the retaining notches; pressing the linking member forces the drag member to drag the retaining members into or away from the retaining notches, facilitating quick dismounting of the saw blade guard. Further, the saw blade quick release structure has the features of simple structure, ease of fabrication and assembly, smoothness of ease of operation in order to save time and labor.

DETAILED DESCRIPTION

In the drawing Figures, it is to be understood that like reference numbers throughout the drawings denote like component parts.

Figure 1:
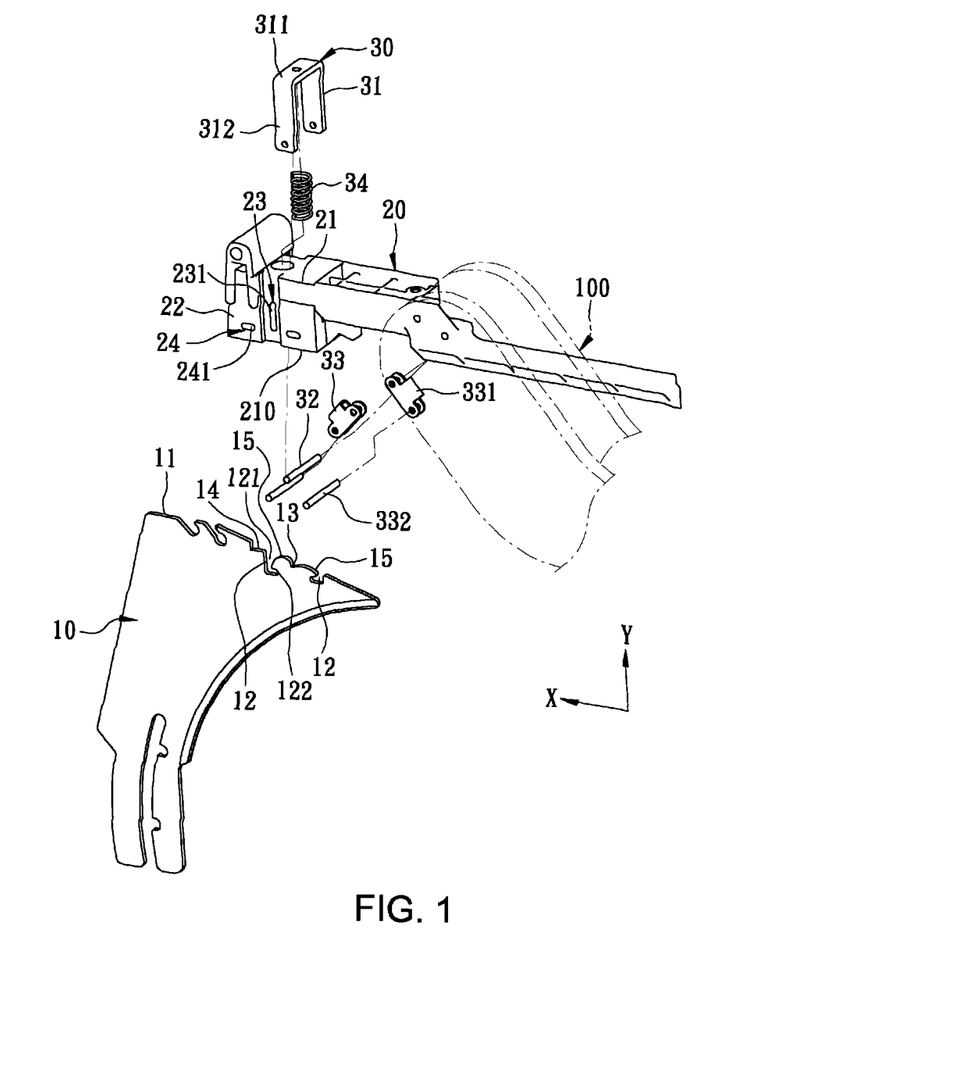
FIG. 1 is an exploded view of a saw blade guard quick release structure for a saw machine in accordance with a first embodiment of the present disclosure.
Figure 2:
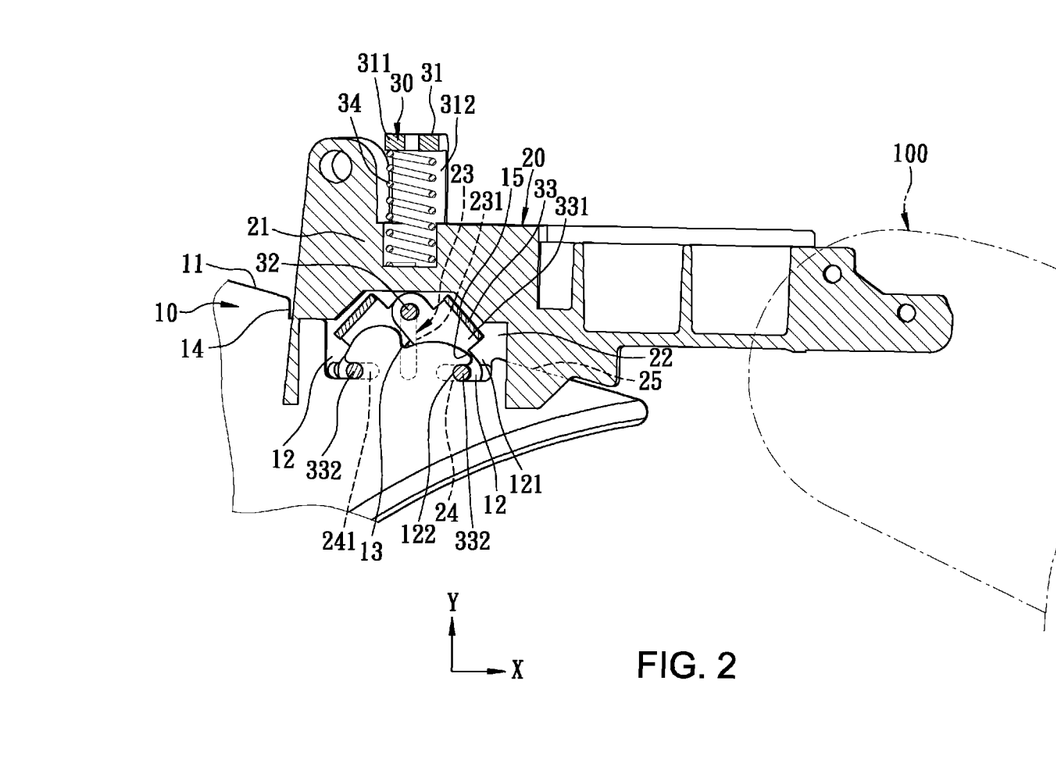
FIG. 2 is a sectional assembly view of the saw blade guard quick release structure for a saw machine in accordance with the first embodiment of the present disclosure.

Referring to FIGS. 1 and 2, a saw blade guard 100 quick release structure in accordance with a first embodiment of the present disclosure is shown. The saw blade guard quick release structure includes a locating member 10, a connection member 20, and a retaining unit 30.

The locating member 10 in this embodiment is a riving knife, including a top edge 11, two retaining notches 12 located on the top edge 11, a stop portion 13 defined on the top edge between the two retaining notches 12, a locating portion 14 located on the top edge 11 at one side relative to the retaining notches 12 and two guide faces 15 located on the top edge 11 and respectively connected between the stop portion 13 and the retaining notches 12. The retaining notches 12 are L-shaped notches. Each retaining notch includes an entry portion 121 corresponding to the top edge 11 and a stop end 122 oppositely located relative to the entry portion 121. In this embodiment, the stop ends 122 of the two retaining notches 12 are correspondingly disposed; a distance between the two stop ends 122 is shorter than the distance between the two entry portions 121. The locating portion 14 has a substantially concave shape and is disposed along the top edge 11 to one side of the retaining notches 12. The guide faces 15 are generally arc shaped and curved and extend from the top edge 11 toward the entry portion 121 of the respective retaining notch 12.

The connection member 20 is fixedly mounted to the saw blade guard 100 and fastenable to the locating portion 14. The connection member 20 includes a top wall 21, a bottom edge 210 opposite to the top wall 21, two opposed sidewalls 22 respectively connected to the top wall 21 at two opposite lateral sides, a first guide portion 23, and two second guide portions 24 which are respectively disposed at two opposite sides of the first guide portion 23. The first guide portion 23 extends along a first direction Y toward the top wall 21 in a perpendicular manner with respect to the top wall 21. In this embodiment, the first guide portion 23 includes two first sliding slots 231 respectively located on the two sidewalls 22. The second guide portions 24 extend along a second direction X which is perpendicular to the first direction Y generally along the bottom edge 210. Each second guide portion 24 includes two second sliding slots 241 which are respectively located on the two sidewalls 22 and extend in the second direction X perpendicular to the first sliding slots 231. Further, the connection member 20 has a mounting groove 25 defined therein, which is located below the top wall 21 corresponding to the locating portion 14 for being mounted at the top side of the locating member 10.

The retaining unit 30 is mounted on the connection member 20 and is fastenable to the locating member 10. The retaining unit 30 includes a linking member 31, a drag member 32 connected to the linking member 31 and movable along the first guide portion 23, two retaining members 33 respectively pivotally connected to the drag member 32 and a spring member 34 that is sandwiched between the linking member 31 and the connection member 20. The linking member 31 is in the form of a U-shaped. The linking member 31 includes a pressure plate 311 transversely located on a middle portion corresponding to the top wall 21 of the connection member 20 and two side plates 312 respectively extended from the two distal ends of the pressure plate 31 and corresponding to the sidewalls 22 of the connection member 20. The drag member 32 is shaped like a pin and is inserted through the first sliding slots 231 and connected between the two side plates 312. Each of the two retaining members 33 includes a link 331 and a retaining rod 332 inserted through one end of the retaining member 33. The two retaining rods 332 are respectively inserted through and slidable along the second guide slots 241, and are adapted for selective engagement with the respective the retaining notches 12 of the locating member 10. The two opposite ends of each link 331 are pivotally connected to the drag member 32 and the retaining rods 332 respectively. The spring member 34 is a compression spring and is sandwiched between the top wall 21 of the connection member 20 and the pressure plate 311 of linking member 31. The spring member 34 imparts a pressure to the drag member 32 such that the drag member 32 is continuously biased toward a first position (i.e., the top end of the first sliding slots 231).

Figure 3:
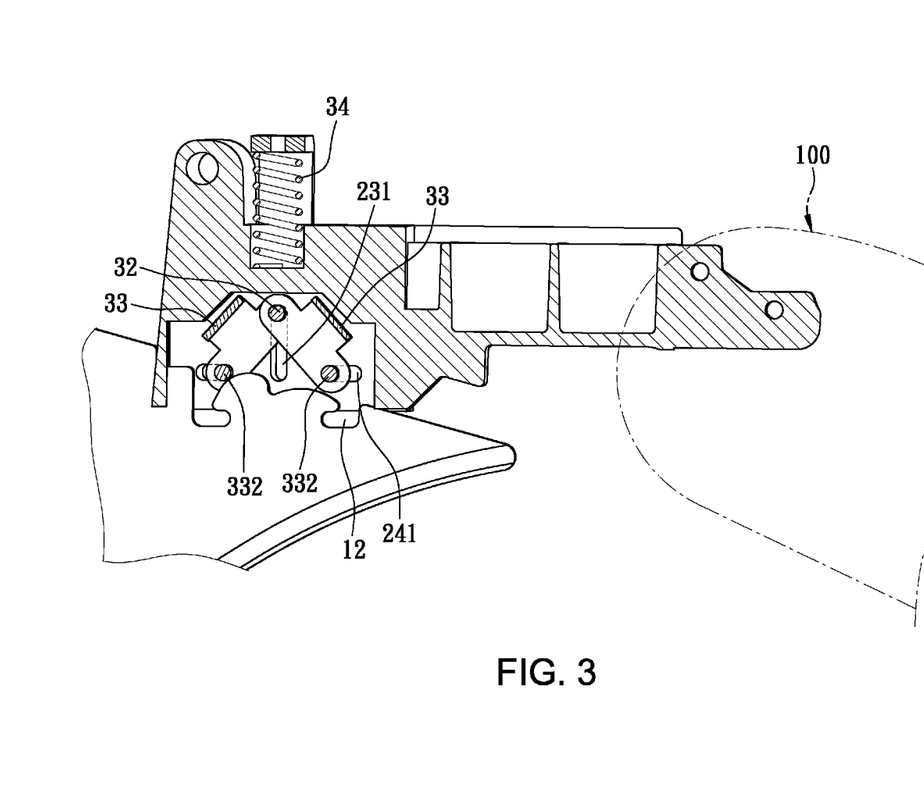
FIG. 3 is a sectional elevation view of the first embodiment of the present disclosure, similar to FIG. 2, illustrating the disengagement of the saw blade guard from a locating member.
Figure 4:
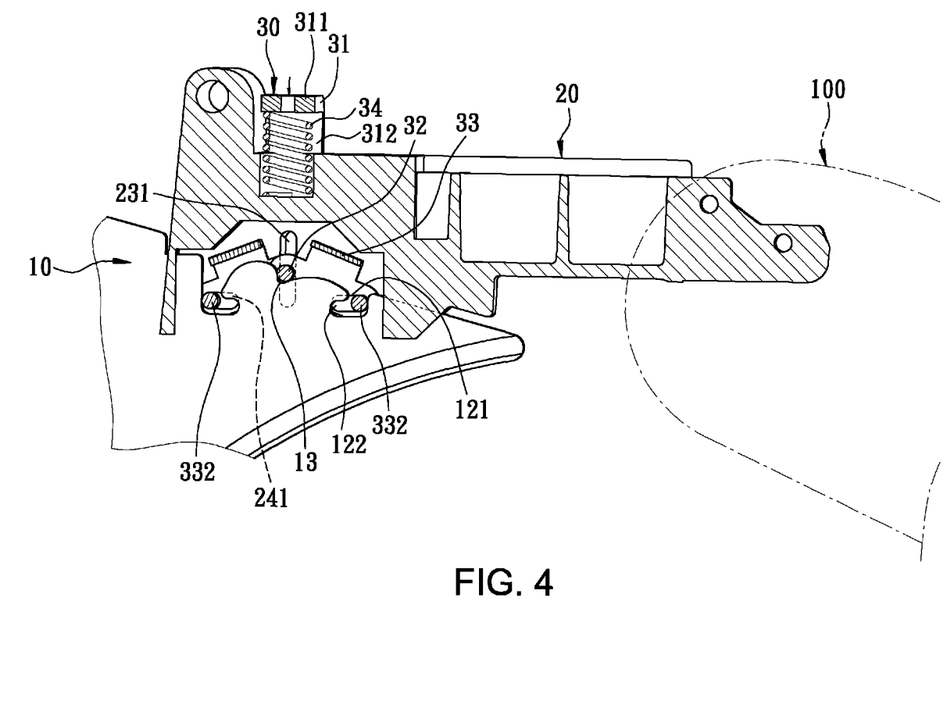
FIG. 4 is a sectional operational view, similar to FIGS. 1 and 2, of the saw blade guard quick release structure for a saw machine in accordance with the first embodiment of the present disclosure.

Referring to FIGS. 3 and 4, normally, a spring force of the spring member 34 maintains the drag member 32 in the first position at the top end of the first sliding slots 231, and the retaining rods 332 are respectively located at inner ends of the second sliding slots 241 and such that the retaining rods 332 are oriented toward each other with their shortest distance therebetween.

When an operator intends to mount the saw blade guard 100 at the locating member 10, the operator can press the pressure plate 311 of the linking member 31 such that the spring member 34 is compressed. At this time, the drag member 32 is driven by the side plates 312 of the linking member 31 to move downwardly along the first sliding slots 231 from the first position to a second position (toward the bottom ends of the first sliding slots 231), consequently causing a movement of the retaining rods 332 of the retaining members 33 along the second sliding slots 241 in a direction toward respective outer ends of the second sliding slots 241. When the operator attaches the saw blade guard 100, the connection member 20 and the retaining unit 30 to the locating member 10, the drag member 32 is engaged with the stop portion 13, and then the retaining rods 332 of the retaining members 33 are respectively forced into the entry portions 121 of the retaining notches 12. Further, when the operator releases the linking member 31, the drag member 32 will be immediately moved by a resilient force of the spring member 34 from the second position toward the first position and to further force the retaining rods 332 of the retaining members 33 into engagement with the stop ends 122 of the retaining notches 12, thereby locking the saw blade guard 100 to the locating member 10 (see FIG. 2).

In order to detach the saw blade guard 100, the operator presses the linking member 31 to reach the status shown in FIG. 4, and then the saw blade guard 100, the connection member 20 and the retaining unit 30 are removed from the locating member 10, as shown in FIG. 3.

Thus, by means of the above described structural design, the present disclosure achieves quick release of the saw blade guard 100, and has the features of simple structure, ease of fabrication and assembly, and smooth operation in order to save time and labor.

In practice mounting of the saw blade guard 100 at the top side of the locating member 10 can be achieved by: directly attaching the connection member 20 to the locating member 10 to let the retaining rods 332 of the retaining members 33 be respectively guided by the guide faces 15 to move apart from each other (see FIG. 4) until the retaining rods 332 reach the outer ends of the second sliding slots 241 and the drag member 32 is forced by the retaining members 33 to move from the first position to the second position (i.e., the bottom ends of the first sliding slots 231). At this time, the linking member 31 is driven by the drag member 32 to move the pressure plate 311 toward the connection member 20 and to further compress the spring member 34. When the operator continuously moves the connection member 20 toward the locating member 10 to force the retaining rods 332 of the retaining members 33 into the entry portions 121 of the retaining notches 12. Subsequently, the spring force of the spring member 34 will then force the linking member 31 to move the drag member 32 from the second position toward the first position, causing the retaining rods 332 of the retaining members 33 to be forced into engagement with the stop ends 122 of the retaining notches 12 to lock the saw blade guard 100 to the locating member 10 (see FIG. 2).

In order to detach the saw blade guard 100 from the locating member 10, the operator can press the pressure plate 311 of the linking member 31 such that the drag member 32 is driven by the side plates 312 to move slidably downwardly along the first sliding slots 231 from the first position to the second position (i.e., at the bottom ends of the first sliding slots 231), and simultaneously causing the retaining members 33 to be forced by the drag member 32 to move the retaining rods 332 along the second sliding slots 241 to the outer ends thereof where the retaining rods 332 are respectively maintained in alignment with the entry portions 121 of the retaining notches 12. At this time, the operator can remove the saw blade guard 100, the connection member 20, and the retaining unit 30 from the locating member 10, as shown in FIG. 3.

FIGS. 5-8 illustrate a saw blade guard quick release structure in accordance with a second embodiment of the present disclosure. According to this second embodiment, the saw blade guard quick release structure includes a locating member 10', a connection member 20', and a retaining unit 30'.

Figure 5:
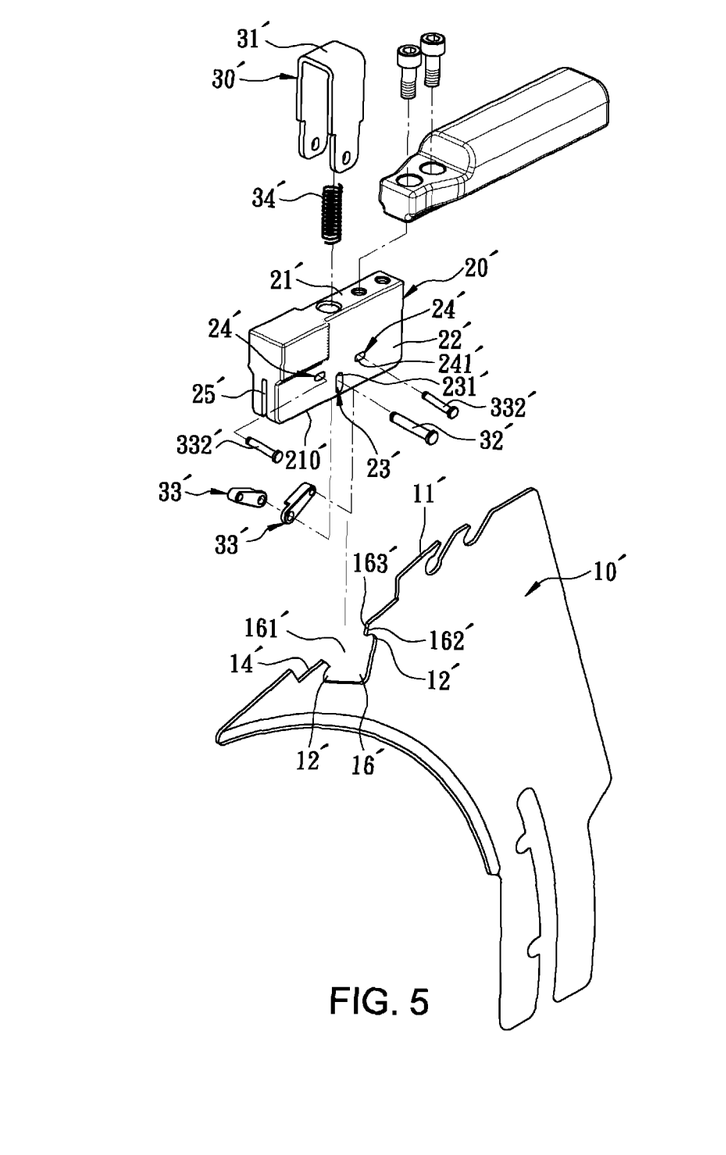
FIG. 5 is an exploded view of a saw blade guard quick release structure for a saw machine in accordance with a second embodiment of the present disclosure.

The locating member 10' includes a top edge 11', an opening 16' extending to the top edge 11', two retaining notches 12' defined near the top edge 11' within the opening 16' and respectively located at two opposite sides of the opening 16', and a locating portion 14' disposed between the top edge 11' and the opening 16'. The two retaining notches 12' are respectively disposed at two opposite sides relative to a midline L which extends through the middle part of the opening 16'. The retaining notches 12' are thus maintained in communication with the opening 16'. The opening 16' defines an entry 161' corresponding to the top edge 11', and two constraint portions 162' respectively disposed between the entry 161' and the retaining notches 12'. Each of the constraint portions 162' defines a beveled guide face 163' sloping from the corresponding entry 161' to the retaining notches 12' and toward the midline L.

The connection member 20' includes a top wall 21', a bottom edge 210' opposite to the top wall 21', two opposed sidewalls 22' respectively connected to the top wall 21' at two opposite lateral sides thereof, a first guide portion 23', and two second guide portions 24' respectively disposed at two opposite sides relative to the first guide portion 23'. The first guide portion 23' is disposed adjacent to the bottom edge 210', and has two first sliding slots 231' defined therein and respectively located on the two opposed sidewalls 22'. The two first sliding slots 231' extend along a first direction toward the top wall 21' in a perpendicular manner with respect to the top wall 21'. The two second guide portions 24' are disposed above the first guide portions 23', closer to the top wall 21', and each has two second sliding slots 241' defined therein and respectively located on the two opposed sidewalls 22' in a perpendicular manner relative to the first sliding slots 231'. The connection member 20' further includes a mounting groove 25' defined therein and located below the top wall 21' and corresponding to the locating portion 14' for being mounted at the top side of the locating member 10' to support the top wall 21' at the locating portion 14'.

The retaining unit 30' is mounted on the connection member 20', and includes a linking member 31', a drag member 32' connected to the linking member 31' and movable along the first guide portion 23'. Two retaining members 33' are respectively pivotally connected to the drag member 32' and a spring member 34' is sandwiched between the linking member 31' and the connection member 20'.

Figure 6:
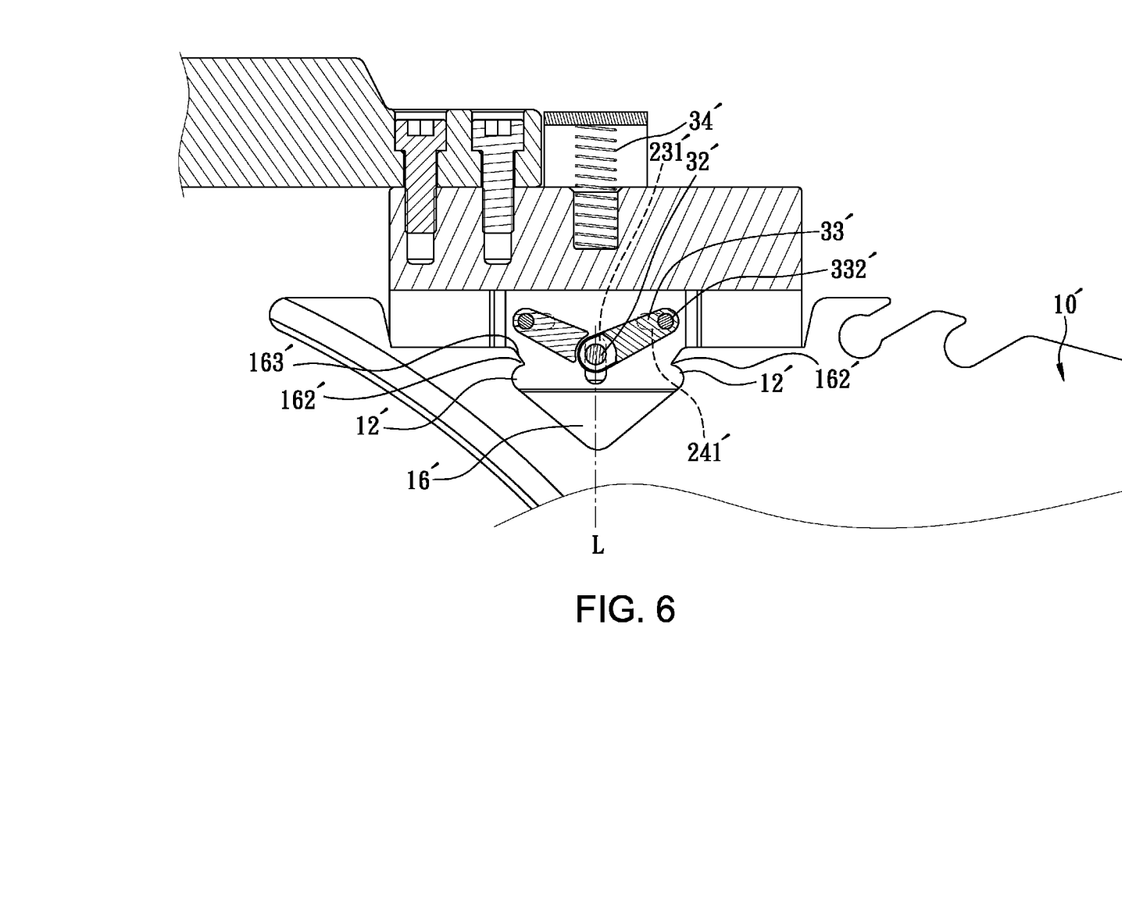
FIG. 6 is a sectional elevation view of the second embodiment of the present disclosure, illustrating the disengagement of the saw blade guard from the locating member.

Normally, as shown in FIG. 6, the spring force of the spring member 34' biases and holds the drag member 32' in a first position at the top ends of the first sliding slots 231', and the retaining rods 332' of the retaining members 33' are respectively retained at the outer ends of the second sliding slots 241' and are oriented spaced away from each other.

Figure 7:
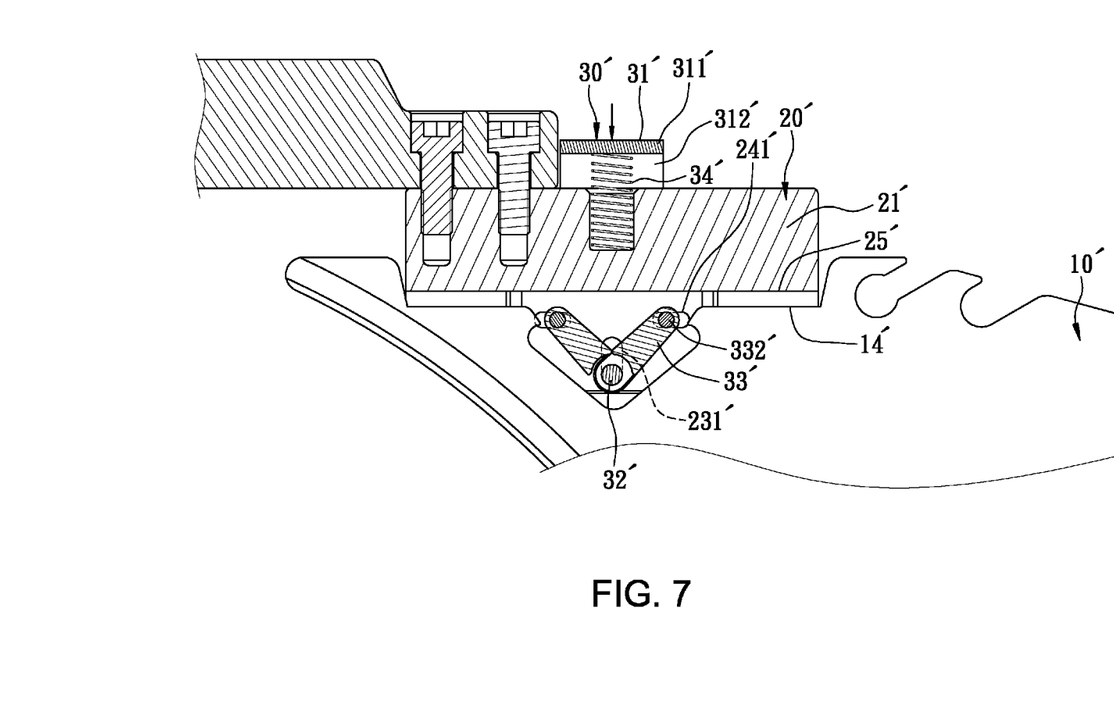
FIG. 7 is a sectional operational view of the saw blade guard quick release structure for a saw machine in accordance with the second embodiment of the present disclosure.
Figure 8:
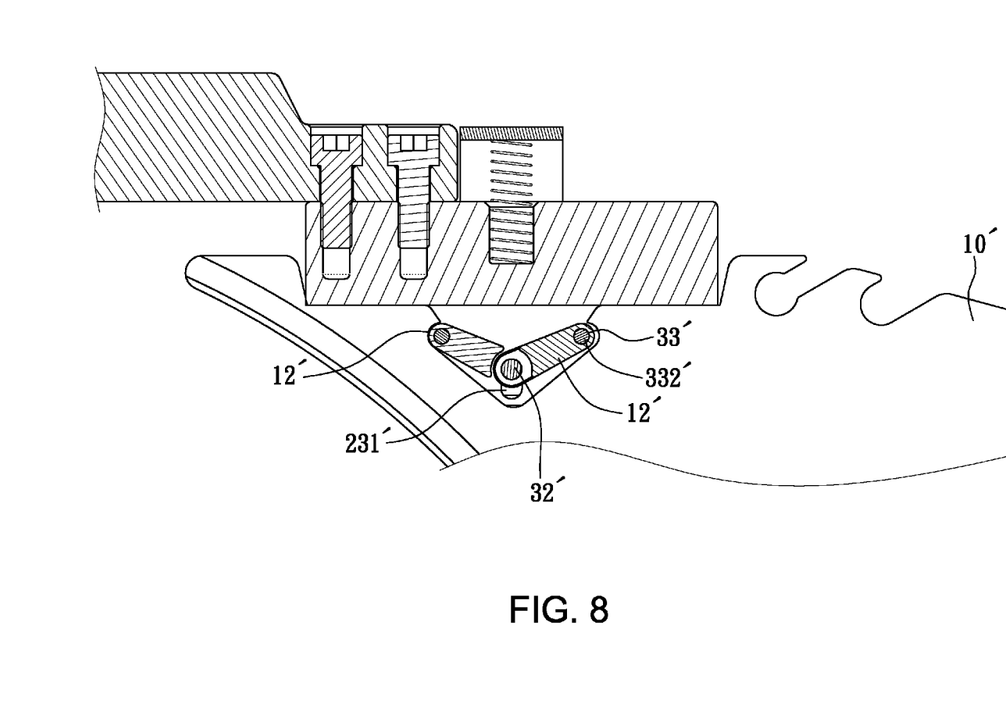
FIG. 8 is a sectional assembly view of the saw blade guard quick release structure for a saw machine in accordance with the second embodiment of the present disclosure.

In order to mount the saw blade guard to the locating member 10', as shown in FIG. 7, the operator can press the pressure plate 311' of the linking member 31' to compress the spring member 34', and at this time, the drag member 32' is driven by the side plates 312' of the linking member 31' to move downwardly along the first sliding slots 231' and to move from the first position to a second position (toward the bottom ends of the first sliding slots 231'), causing the movement of the retaining rods 332' of the retaining members 33' along the second sliding slots 241' in a direction toward each other until reaching the respective inner ends of the second sliding slots 241'. When the operator attaches the saw blade guard, the connection member 20', and the retaining unit 30' to the locating member 10', the mounting groove 25' of the connection member 20' is forced into engagement with the locating portion 14' to support the top wall 21' on the locating portion 14'. When the operator releases the pressure from the linking member 31', at this time, the drag member 32' will be immediately forced by the spring force of the spring member 34' to move from the second position toward the first position and to further force the retaining rods 332' of the retaining members 33' into engagement with the retaining notches 12', thereby locking the saw blade guard to the locating member 10' (see FIG. 8).

In order to detach the saw blade guard, the user can press the pressure plate 311' of the linking member 31' to force the side plates 312' to drive the drag member 32' to reach the status shown in FIG. 7, thus allowing the removal of the assembly of the saw blade guard, the connection member 20', and the retaining unit 30' from the locating member 10', as shown in FIG. 6.

When mounting the saw blade guard to the locating member 10', the operator can also directly attach the connection member 20' to the locating member 10' to let the retaining rods 332' of the retaining unit 30' be guided by the beveled guide faces 163' to move along the second sliding slots 241' toward each other (see FIG. 7) and then into engagement with the inner ends of the second sliding slots 241', causing the drag member 32' to be forced by the retaining members 33' to move from the first position to the second position (i.e., at the bottom ends of the first sliding slots 231'). At this time, the linking member 31' is dragged by the drag member 32' to move the pressure plate 311' toward the connection member 20' and to compress the spring member 34'. When the operator keeps imparting a pressure to the connection member 20' against the locating member 10' to move the retaining rods 332' into the opening 161' and over the constraint portions 162', the drag member 32' will be immediately forced by linking member 31', subject to the effect of the spring force of the spring member 34', to move from the second position toward the first position and to further force the retaining rods 332' of the retaining members 33' into engagement with the retaining notches 12', thereby locking the saw blade guard to the locating member 10' (see FIG. 8).

In order to detach the saw blade guard, the operator can press the pressure plate 311' of the linking member 31' such that the drag member 32' is driven by the side plates 312' to move downwardly along the first sliding slots 231' from the first position to the second position (i.e., at the bottom ends of the first sliding slots 231') and causing the retaining rods 332' of the retaining members 33' to be carried by the drag member 32' along the second sliding slots 241' toward each other to a state where the retaining rods 332' are respectively located at the inner ends of the second sliding slots 241'. At this time, the retaining rods 332' can be moved out of the retaining notches 12'. Thus, the operator can then detach the assembly of the saw blade guard, the connection member 20', and the retaining unit 30' from the locating member 10', as shown in FIG. 6.

The aforesaid second embodiment of the present disclosure achieves the same objects and effects, and has the features of simple structure, ease of fabrication and assembly, smooth operation and saves time and labor.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:

1. A saw blade guard quick release structure, comprising:
   a locating member having two retaining notches defined therein;
   a connection member affixed to a saw blade guard, said connection member comprising a first guide portion and two second guide portions located at two opposite sides of said first guide portion, said first guide portion extending along a first direction, said second guide portion extending along a second direction, perpendicular to the first direction; and
   a retaining unit mounted to said connection member and selectively fastenable to said locating member, said retaining unit having a linking member, a drag member connected to said linking member and slidable along said first guide portion between a first position and a second position, two retaining members respectively pivotally connected to said drag member, and a spring member sandwiched between said linking member and said connection member and adapted to impart a pressure to bias said drag member toward said first position, each said retaining member having a retaining rod slidable along respective second guide portions and selectively engageable in said retaining notches, said retaining members and said drag member being mutually driven by each other between a locking position and an unlocking position; wherein said retaining rods of said retaining members are respectively engaged with said retaining notches in a locking position, and said retaining rods of said retaining members are respectively disengaged from said retaining notches in an unlocking position.

2. The saw blade guard quick release structure according to claim 1, wherein said locating member has a top edge; said retaining notches have a substantially L-shaped profile and are defined along said top edge; each said retaining notch has an entry portion corresponding to said top edge and a stop end opposite to said entry portion.

3. The saw blade guard quick release structure according to claim 2, wherein said locating member has two guide faces respectively connected to said entry portion and extending from said top edge toward said retaining notches.

4. A saw blade guard quick release structure, comprising:
   a locating member having two retaining notches defined therein;
   a connection member affixed to a saw blade guard, said connection member comprising a first guide portion and two second guide portions located at two opposite sides of said first guide portion, said first guide portion extending along a first direction, said second guide portion extending along a second direction, perpendicular to the first direction; and
   a retaining unit mounted to said connection member and selectively fastenable to said locating member, said retaining unit having a linking member, a drag member connected to said linking member and slidable along said first guide portion between a first position and a second position, two retaining members respectively pivotally connected to said drag member, and a spring member sandwiched between said linking member and said connection member and adapted to impart a pressure to bias said drag member toward said first position, each said retaining member having a retaining rod slidable along respective second guide portions and selectively engageable in said retaining notches, said retaining members and said drag member being mutually driven by each other between a locking position and an unlocking position; wherein said retaining rods of said retaining members are respectively engaged with said retaining notches in a locking position, and said retaining rods of said retaining members are respectively disengaged from said retaining notches in an unlocking position;

wherein said connection member has a top wall, two sidewalls respectively connected to said top wall at two opposite sides thereof; said first guide portion has two first sliding slots defined therein and respectively located on said sidewalls; each said second guide portions has two second sliding slots defined therein and respectively located on said sidewalls in a perpendicular manner relative to said first sliding slots; said linking member of said retaining unit comprises a pressure plate corresponding to said top wall, and two side plates respectively connected to said pressure plate and corresponding to said sidewalls; said drag member coupled between said sidewalls, two ends of said drag member inserted through said first sliding slots respectively; said retaining members respectively inserted through said second sliding slots; said spring member sandwiched between said top wall and said pressure plate of said linking member.

5. The saw blade guard quick release structure according to claim 4, wherein said connection member has a bottom edge opposite to said top wall; said first guide portion is located adjacent to said top wall; said first direction being perpendicular to said top wall; and said second guide portions located adjacent to said bottom edge.

6. A saw blade guard quick release structure, comprising:
a locating member having two retaining notches defined therein;
a connection member affixed to a saw blade guard, said connection member comprising a first guide portion and two second guide portions located at two opposite sides of said first guide portion, said first guide portion extending along a first direction, said second guide portion extending along a second direction, perpendicular to the first direction; and
a retaining unit mounted to said connection member and selectively fastenable to said locating member, said retaining unit having a linking member, a drag member connected to said linking member and slidable along said first guide portion between a first position and a second position, two retaining members respectively pivotally connected to said drag member, and a spring member sandwiched between said linking member and said connection member and adapted to impart a pressure to bias said drag member toward said first position, each said retaining member having a retaining rod slidable along respective second guide portions and selectively engageable in said retaining notches, said retaining members and said drag member being mutually driven by each other between a locking position and an unlocking position; wherein said retaining rods of said retaining members are respectively engaged with said retaining notches in a locking position, and said retaining rods of said retaining members are respectively disengaged from said retaining notches in an unlocking position;

wherein said locating member has an opening defined therein and communicating with said top edge, and a locating portion substantially concave shaped and disposed along said top edge adjacent said opening; said retaining notches respectively located at two opposite sides relative to a midline extending through a middle part of said opening and communicating with said opening; and said top wall of said connection member is selectively attachable to said locating portion of said locating member.

7. The saw blade guard quick release structure according to claim 6, wherein said opening has an entry defined therein corresponding to said top edge, two constraint portions respectively disposed between said entry and said retaining notches, and each constraint portion defines a beveled guide face sloping from the top edge toward said midline.

8. The saw blade guard quick release structure according to claim 7, wherein said connection member has a bottom edge opposite to said top wall; said first guide portion is located adjacent to said bottom edge; said first direction extends perpendicularly to said top wall; and said second guide portions are located above the first guide portion closer to said top wall.

* * * * *